(12) United States Patent
Calvert et al.

(10) Patent No.: US 6,779,660 B1
(45) Date of Patent: Aug. 24, 2004

(54) METHOD AND APPARATUS FOR INSTALLING A PREPACKAGED PISTON ASSEMBLY IN AN ENGINE

(75) Inventors: Kenneth D. Calvert, Morton, IL (US); Edward R. Gillis, Bloomington, IL (US); Kevin M. Scott, Dunlap, IL (US); Houston Weaver, Jr., Savannah, TN (US); Michael D. Wesner, Morton, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/960,216

(22) Filed: Sep. 21, 2001

Related U.S. Application Data

(63) Continuation-in-part of application No. 09/438,071, filed on Nov. 10, 1999, now Pat. No. 6,318,551.

(51) Int. Cl.[7] .............................................. B65D 85/68
(52) U.S. Cl. ................................ 206/319; 29/888.044
(58) Field of Search ................................. 206/318, 319, 206/335; 29/222, 888.04, 888.061, 434, 559; 92/128, 190, 216, 219, 238, 239, 261; 123/193.1, 193.6

(56) References Cited

U.S. PATENT DOCUMENTS

| | | | |
|---|---|---|---|
| 3,754,312 A | | 8/1973 | Komorek |
| 3,946,873 A | * | 3/1976 | MacDonnell ............... 206/592 |
| 4,480,368 A | * | 11/1984 | Vachon .................. 29/888.061 |
| 4,530,141 A | * | 7/1985 | Vachon ......................... 92/128 |
| 4,594,760 A | * | 6/1986 | Dillard ........................ 206/319 |
| 4,615,440 A | * | 10/1986 | Downing ..................... 206/319 |
| 4,722,440 A | * | 2/1988 | Johnston ..................... 206/319 |
| 4,941,440 A | * | 7/1990 | Weber et al. ............. 123/193.6 |
| D316,214 S | | 4/1991 | O'Donnell |
| 5,307,732 A | * | 5/1994 | Berlinger ..................... 92/190 |
| 5,588,525 A | * | 12/1996 | Rosler ......................... 206/319 |
| 5,765,272 A | | 6/1998 | Borcicky |
| 5,992,634 A | * | 11/1999 | Woodring et al. ....... 206/524.3 |

OTHER PUBLICATIONS

Bombardier Inc. Shop Manual dated 1989, 6 pages, Quebec, Canada.

* cited by examiner

*Primary Examiner*—Luan K. Bui
(74) *Attorney, Agent, or Firm*—Thomas L Derry; W. Bryan McPherson

(57) ABSTRACT

This invention relates generally to a piston assembly and more specifically to a piston assembly in a prepackaged configuration. The prepackaged piston assembly is ready for immediate installation into an engine or compressor. The piston assembly has a plurality of rings preinstalled on a piston member and a sleeve position about the piston member and the plurality of rings maintaining the rings in a compressed position ready for installation into an engine. The piston assembly is lowered into a cylinder bore, the sleeve contacts the top surface of a block and the piston assembly can be easily installed into the cylinder bore without the need for the mechanic to compress the plurality of rings. Thus the present invention reduces time and expense required for rebuilding and engine and increases the quality of the rebuild.

10 Claims, 6 Drawing Sheets

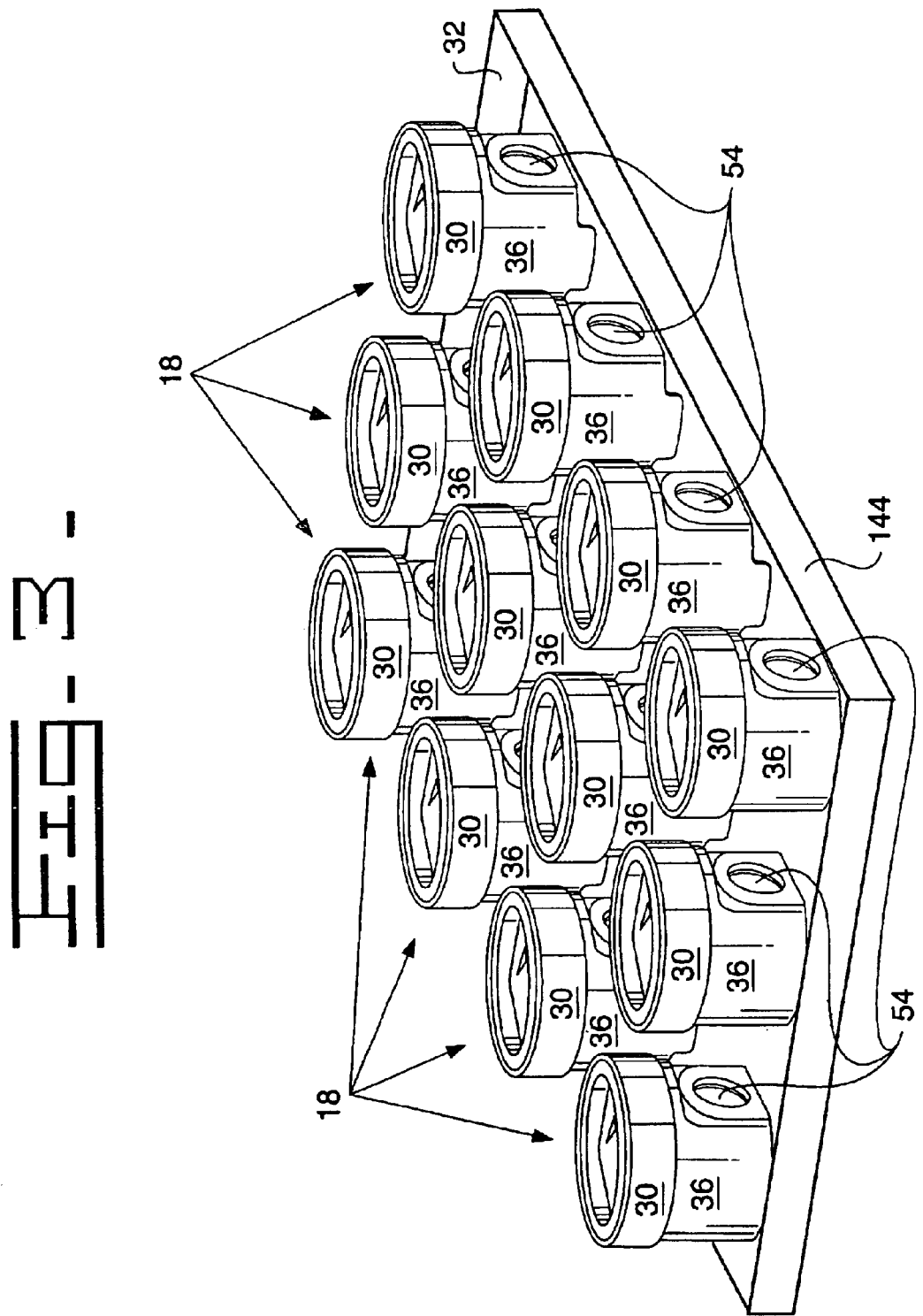

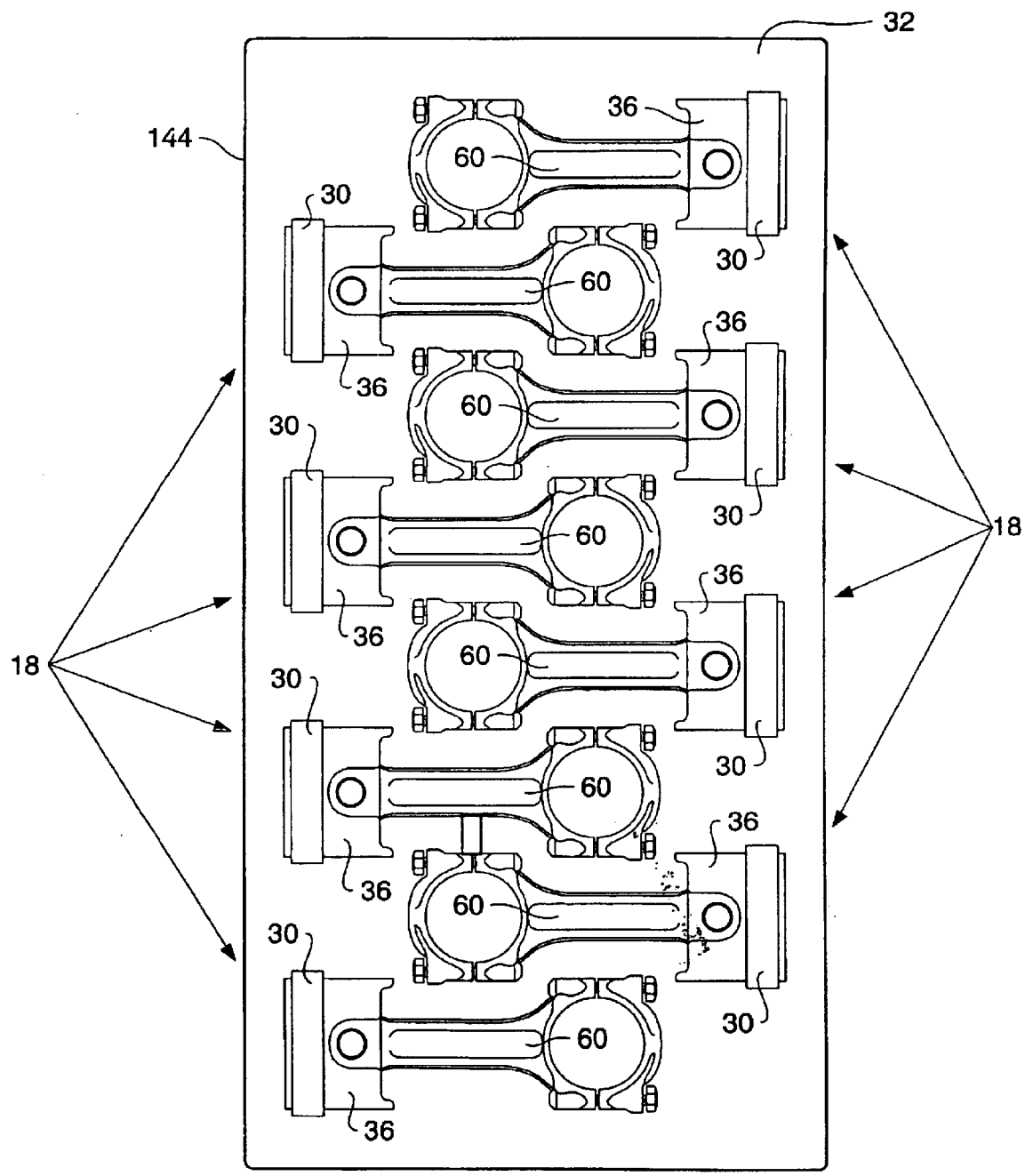

Fig_5_
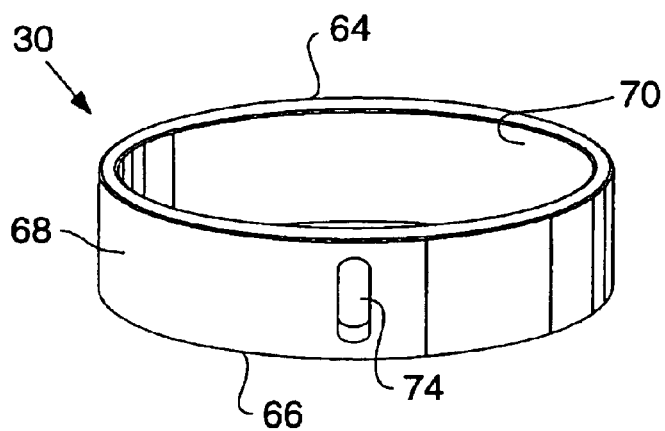
Fig_6_
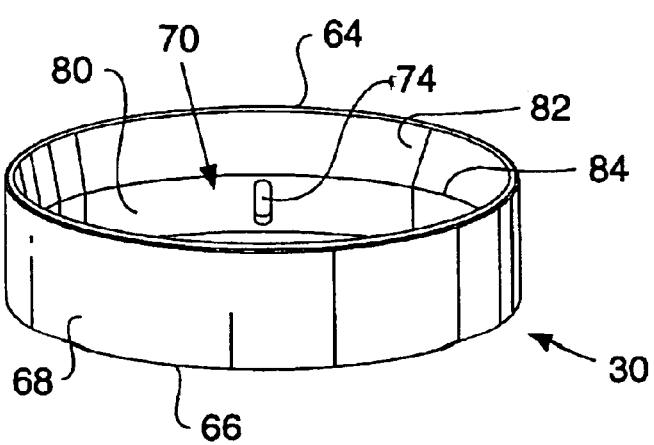

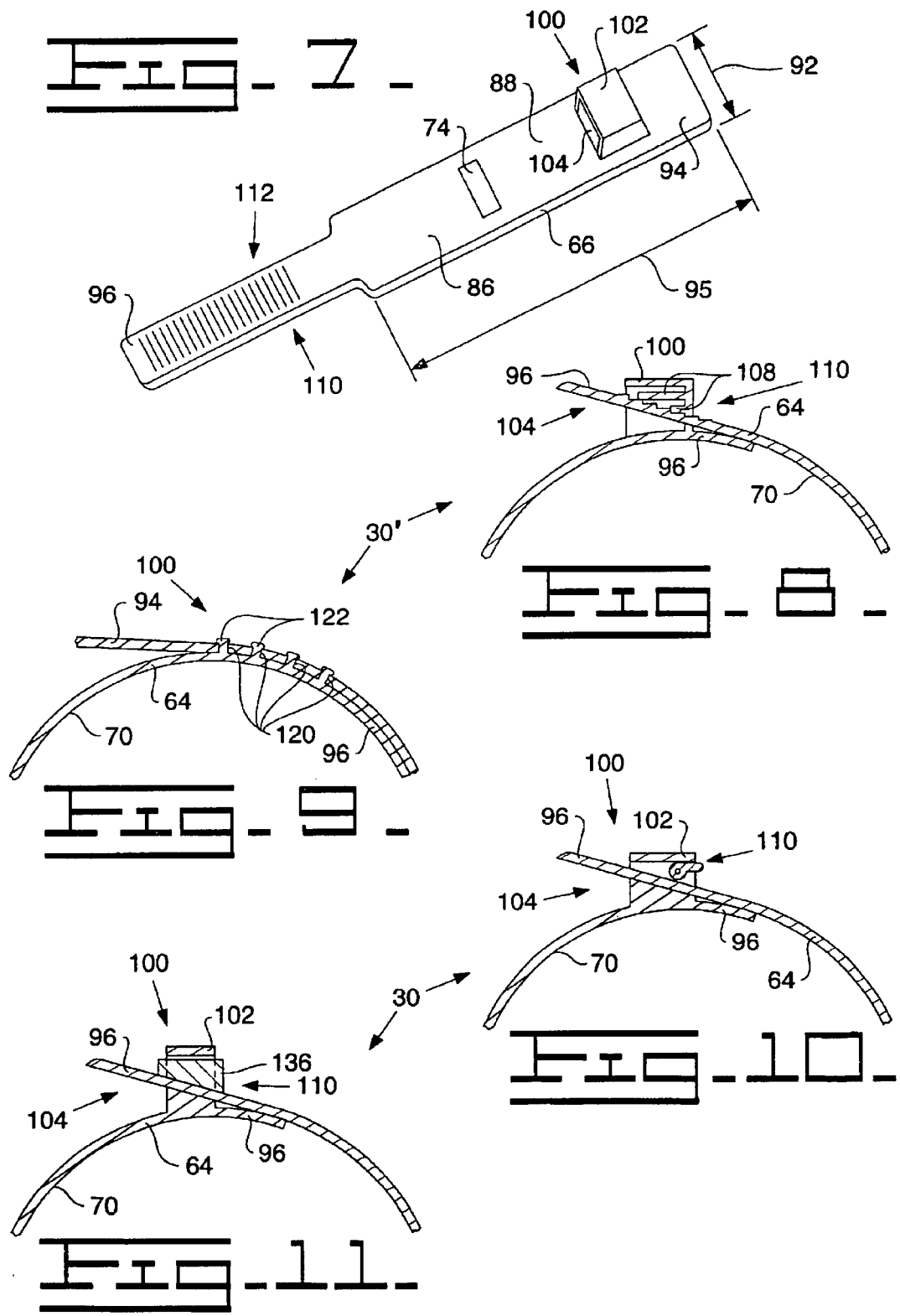

METHOD AND APPARATUS FOR INSTALLING A PREPACKAGED PISTON ASSEMBLY IN AN ENGINE

This is a continuation-in-part of application Ser. No. 09/438,071, filed on Nov. 10, 1999, now U.S. Pat. No. 6,318,551.

TECHNICAL FIELD

This invention relates generally to an internal combustion engine and more specifically to prepackaged piston assemblies which are provided with a plurality of piston rings positioned on each piston member and held in a compressed position.

BACKGROUND

Internal combustion engines have numerous components which need to be assembled in order to provide a complete engine. Engine repair facilities, new engine manufacturers and engine re-manufactures are constantly looking for ways to improve quality and reduce cost of assembling engines. Many engine components are supplied by manufactures other than the engine assembly facility. Engine components such as, pistons, rings, connecting rods and wrist pins are often packaged, shipped and stored separately at the engine manufacturer or assembler. Supplying engine components in this manner is costly, and increases the opportunity to damage components.

Additionally, when used engine components have undergone an excessive amount of wear, the performance and efficiency of the engine is reduced. Engines which have undergone excessive wear are often rebuilt by replacing major components. Many of the components that are normally replaced during the rebuilding process include pistons, piston rings, connecting rods, rod bearings, and main bearings. This rebuilding of the engine brings the engine back to, or near, the engine manufacturer's original performance or specifications. To insure the quality of the rebuilt engine the rebuild process is preferably done in a controlled environment such as a factory or repair shop.

Often with large machines utilizing internal combustion engines, such as those used in the construction and mining industry, the size of the machine restricts transportation to an engine rebuild shop, or the time permitted for the rebuild process requires that the engine of the machine be rebuilt in the field. Often when engines are rebuilt the quality of the rebuild may be jeopardized due to incorrect inspection or assembly of major components such as pistons and piston rings. Loss of quality may increase with engines which are rebuilt in the field under less than an ideal controlled environment.

Additionally the amount of time required to prepare components such as piston assemblies for the rebuild process may be significantly greater in a repair shop or the field than if the same work is done in a factory where larger quantities of components are assembled and manufacturing processes and procedures can be systematically followed. Often in the factory, repetitive work is performed at lower labor cost than where the same work is performed by a skilled mechanic in the field.

The present invention overcomes many of the above identified problems by providing piston assemblies which have been inspected and assembled in a factory environment and packaged in a manner which reduces the likelihood of quality related problems. Labor cost to assemble an engine may also be reduced by eliminating the number of steps to assemble the engines.

SUMMARY OF THE INVENTION

In one aspect of the invention a piston assembly has a prepackaged configuration and is adapted for use with an engine. The engine is comprised of a piston member with a plurality of ring grooves. A plurality of rings are positioned in the ring grooves. A sleeve is positioned about the piston member and the plurality of rings, maintaining the plurality of rings in a compressed position. A container is positioned about the piston member, plurality of rings, and the sleeve.

In another aspect of the invention a method of assembling a piston assembly in an engine is disclosed. The piston assembly has a prepackaged configuration and comprises a piston member with a plurality of rings thereon and a sleeve positioned around the piston assembly and the plurality of rings. The sleeve maintains the plurality of rings in a compressed position. The method of assembly comprises the following steps. Removing the piston assembly from a container. Positioning the piston assembly in alignment with a cylinder bore. Removing the piston assembly from the sleeve. And, simultaneously inserting the piston assembly into the cylinder bore. The sleeve is discarded after the piston assembly has been installed into the engine.

In another aspect of the invention a sleeve adapted for use with a piston assembly of an engine is provided. The sleeve includes a top surface, a bottom surface and an outer wall. A window is provided in the outer wall.

In another aspect of the invention a method is provided for manufacturing a sleeve for use with a piston assembly having a pre-packaged configuration is provided. The method includes the steps of providing a tube having a predetermined inside diameter, removing a length of the tube and providing a window in the removed tube.

BRIEF DESCRIPTION OF THE DRAWINGS

FIG. 3 is a perspective view of a plurality of piston assemblies without connecting rods arranged in a shipping container.

FIG. 4 is a top view of a of a plurality of pre-packaged piston assemblies arranged on a shipping container.

FIG. 5 is a perspective view of a sleeve, or ring compressor, for maintaining the rings of the prepackaged piston assembly in the compressed position; and FIG. 6 is a perspective view of a second embodiment of the sleeve for maintaining the rings of a prepackaged piston assembly in the compressed position.

FIG. 7 is a perspective view of a strap for use as an alternate embodiment of a sleeve.

FIG. 8 is a partially sectioned view of an embodiment of an alternate sleeve and latching member.

FIG. 9 is a partially sectioned view of an embodiment of an alternate sleeve and latching member.

FIG. 10 is a partially sectioned view of an embodiment of an alternate sleeve and latching member.

FIG. 11 is a partially sectioned view of an embodiment of an alternate sleeve and latching member.

DETAILED DESCRIPTION

Although this embodiment of the present invention refers to use of a piston assembly 10 in a prepackaged configuration 12 for use with an internal combustion engine 14, it should be recognized that the invention is equally as valuable in use with an air compressor or other machines using piston assemblies.

Figure 1:
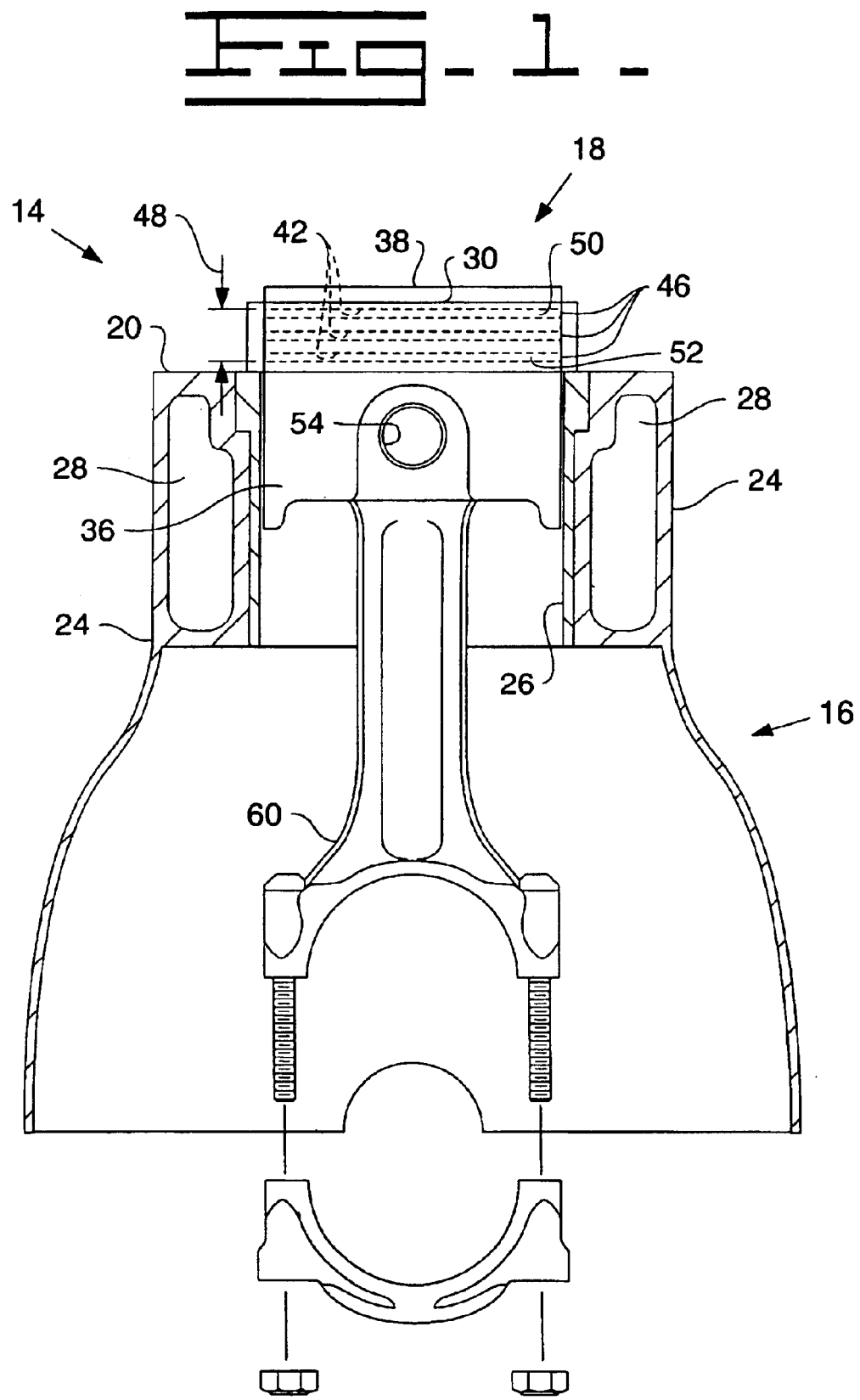
FIG. 1 is a partially sectioned view of an engine having a prepackaged piston assembly partially installed therein.

Referring first to FIG. 1, the engine 14 is illustrated as a partially sectioned view of an engine block 16. A portion of a prepackaged piston assembly 18 is also shown. The block 16 defines a top surface 20 and a pair of outer walls 24 extending downward from each end of the top surface 20. A cylinder bore 26 extends downward from the top surface 20. The cylinder bore 26 may be positioned in a replaceable liner or a fixed bore in the engine block 16. In this application, a water jacket 28 is interposed the cylinder bore 26 and the outer walls 24; however, as an alternative the engine 14 could be air cooled.

Figure 2:
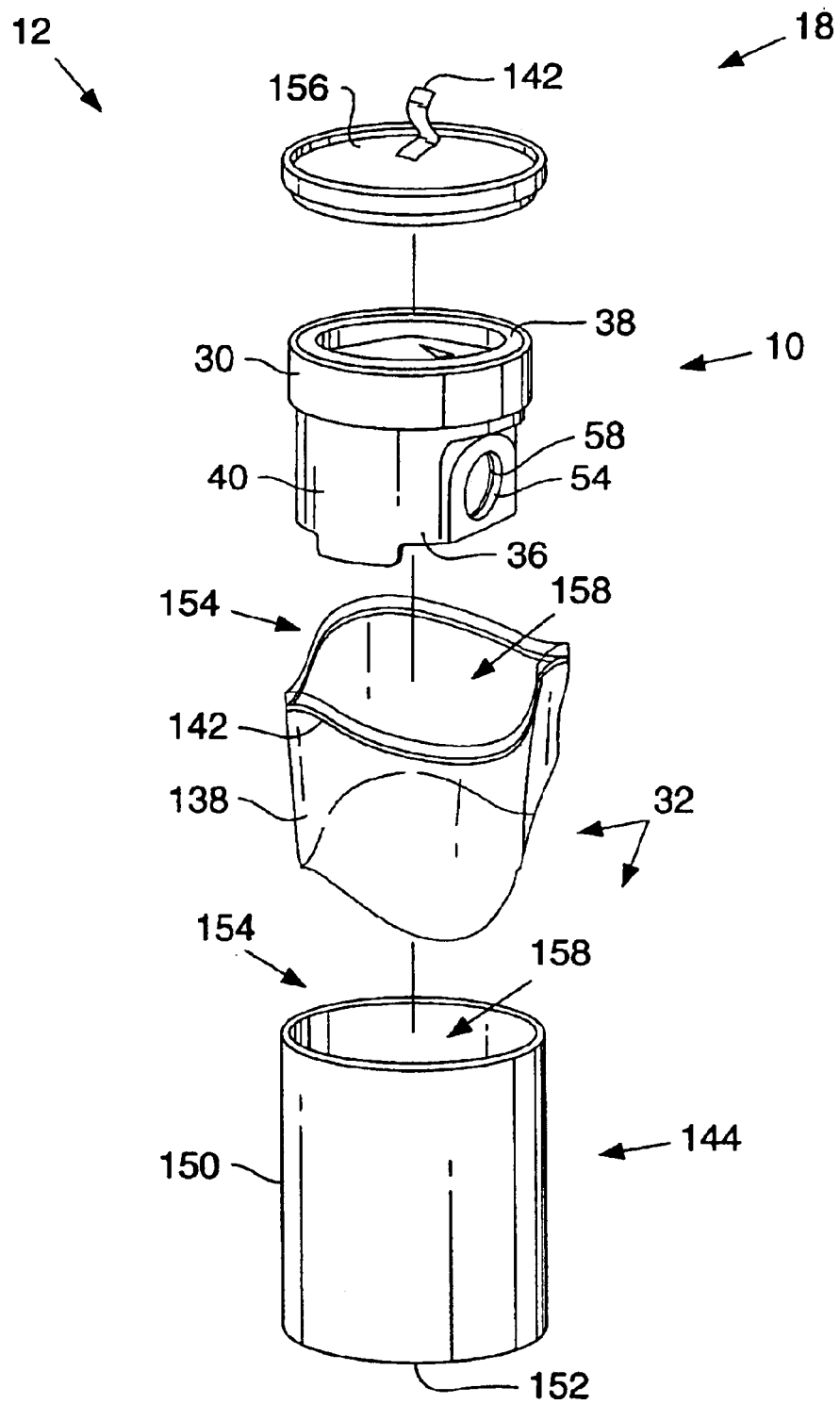
FIG. 2 is a exploded view of a piston assembly and components of the prepackaged configuration.

The prepackaged piston assembly 18 as best shown in FIG. 2 is comprised of a piston assembly 10 a sleeve 30 and a container 32. The piston assembly 10 has a piston member 36 having a top portion 38 and an outer surface 40 defined on the piston member 36. A plurality of ring grooves 42 are positioned in the outer surface 40 below the top portion 38 and a plurality of rings 46 are inserted in the ring grooves 42. The plurality of rings 46 define a ring spread 48. The ring spread 48 can be defined as an axial distance between the top of a top ring groove 50 and the bottom of a bottom ring groove 52. A wrist pin bore 54 extends through the outer surface 40 of the cylindrical piston member 36. A snap ring groove 58 is defined within the wrist pin bore 54 near each end. As an alternative the piston assembly 10 may further have a connecting rod 60. The connecting rod 60 is affixed to the piston member 36 in a conventional manner by using a wrist pin 62. A lubricant and or rust inhibitor may be applied to all or some surfaces of the pre-packaged piston assembly 18.

In the prepackaged configuration 12 of the piston assembly 10, the sleeve 30 is positioned about the piston member 38 and the plurality of rings 46. The sleeve 30 maintains the plurality of rings 46 in a compressed position. The prepackaged piston assembly 18 may in be an individual configuration, or may be in a multiple configuration as shown if FIGS. 3 and 4. The pre-packaged piston assembly 18 may include the connecting rod 60 although it is not required.

The sleeve 30 may be manufactured in a number of ways. Preferably the sleeve 20 is manufacture from a material and in a manner that would minimize cost. As further shown in FIG. 5, a perspective view of one sleeve 30 of the present invention is illustrated. The sleeve 30 has a top surface 64 a bottom surface 66 and an outer wall 68. A sleeve bore 70 (or inner wall) extends between the top surface 64 and the bottom surface 66. A window 74 may extend from the outer wall 68 to the sleeve bore 70. An alternative to the window 74 is a sleeve being made from a transparent material. The sleeve bore 70 is of a predetermined inside diameter 76 which is equal to or slightly smaller than the diameter of the cylinder bore 26 and slightly larger the outside diameter 78 of the piston member 36.

As further shown in FIG. 6, another embodiment of the sleeve 30 is shown. The sleeve 30 has a top surface 64 a bottom surface 66 and an outer wall 68. A sleeve bore 70 is defined between the top surface 64 and the bottom surface 66. The sleeve bore 70 defines a straight portion 80 extending from the bottom surface 68 toward the top surface 66. A tapered portion 82 of the sleeve bore 70 extends outwardly from a top end 84 of the straight portion 80 to the top surface 64. The length of the straight portion 80 is at least equal to the ring spread 48 of the piston member 36.

Referring now to FIGS. 7–11, an alternate sleeve 30' may be formed from a substantially flat strap 86. The formed sleeve 30' provides a variable inside diameter 90 that is substantially equal to that of the piston member 36. The flat strap 86 includes a sleeve portion 88 having predetermined width 92 at a first end 94 of the strap 86. Additionally, the sleeve portion 88 includes a predetermined length 95. The predetermined length 95 must be at least equal to the circumference of the piston member 36 that the sleeve 30 will be used on. A second end 96 has a narrower width than that of the predetermined width 92. The predetermined width 92 is equal to or greater than the ring spread 48 of the piston member 36. A latching member 100 is provided near the first end 94. The latching member 100 is adapted to receive the second end 96, to form the sleeve 30'. The latching member 100 is preferably adapted to varying the inside diameter 76 of the sleeve 30'.

The latching member 100 may be provided in a variety of configurations. Some examples of latching members 100 are described hereafter, but it should be noted that any number of conventional latching members are suitable, yet not described.

An embodiment of a latching member 100 is illustrated in FIG. 8, and is similar to that of a plastic wire tie. The latching member 100 includes a body portion 102. The body portion 102 has a slot 104 defined therein. At least one barb 108 (or catch) is disposed within the slot 104. A mating portion 110 of the strap 86 is adapted to be positioned within the slot 104. The mating portion 110 may include a friction portion 112. The friction portion 112 illustrated in FIG. 7 is a plurality of ribs 114 disposed along a surface 116 of the strap 86. The friction portion 110 is configured to permit movement of the mating portion 110 relative to the slot 104.

Referring now to FIG. 9, an embodiment for the latching member 100 is similar to that used to adjust the size of a hat. Near the first end 94 of the strap 86 a plurality of openings 120 are spaced predetermined distance from one and other. On the first end 94 of the strap 86 one or more protrusions 122 extend outward from the surface 116 of the strap 86. The protrusions 122 include a body portion 124 and a head portion 126. The body portion 124 of the protrusion 122 is of a slightly smaller diameter than that of the head portion 126. At least one of the protrusions 122 and at least one of the openings 120 are adapted to engage one and other and form a sleeve 30 of the appropriate inside diameter 76.

Referring now to FIG. 10, an embodiment of a latching member 100 is illustrated. The body portion 102 is defined near the first end 94 of the strap 86. The body portion 102 also includes the slot 104 and is adapted to receive the second end 96. Within the body portion 102 a rotatable cam 130 is disposed, and pivotable between a first and second position. The cam 130 includes a lever portion 132 adapted to rotate the cam 130. In the first position the second end 96 of the strap 86 is moveable within the slot 104. With the cam 130 in the second position, the second end 96 is fixedly interposed the cam 130 and the slot 104.

Referring now to FIG. 11, an embodiment of the latching member 100 having a wedge member 134 is illustrated. The wedge member 134 is positioned within the slot 104 and moveable between a first position and a second position. In the first position the second end 96 of the strap 86 is moveable within the slot 104. With the wedge member 134 in the second position the second end 96 of the strap 86 is fixedly interposed the slot 104 and the wedge member 134.

Referring again to FIG. 2, in the prepackaged configuration 12, the pre-packaged piston assembly 18 is sealed in the container 32. In this embodiment the container is a plastic bag 138. The plastic bag 138 is coated on the inside with a rust inhibitor and/or lubricant. The plastic bag 138 defines a cavity 140 which is capable of accommodating the prepackaged configuration 12 of the piston assembly 10. Alternatively of the plastic bag 138, a flexible sheet having a protective coating and a seal 142 could be used. The flexible sheet may be constructed of many different materials including, but not limited to, paper, waxed paper and plastic. The flexible sheet may additionally be coated or impregnated with the rust inhibitor and/or lubricant.

Referring again to FIGS. 3 and 4, a plurality of prepackaged piston assemblies 18 arranged in a single shipping container is shown. The piston assemblies 10 may include the connecting rod 60 as illustrated in FIG. 4. As shown in FIG.3, the piston assemblies 10 may be packaged without the connecting rod 60. The piston assemblies 10 may be coated with the lubricant and/or rust inhibitor as previously discussed. A foam sheet having a plurality of cavities 158 that are shaped to fit the piston assemblies 10 may be used. Alternately, conventional packing materials may surround all or part of the piston assemblies 10. The second container 144 may further be adapted to receive a plurality of layers of piston assemblies 10. Each of the plurality of layers may be positioned on a tray 162 that is adapted to hold the packing materials and piston assemblies 10. Sheets of plastic or paper having a protective coating may be wrapped around the piston assemblies 10. The sheets of plastic or paper may also be coated with the lubricant and/or rust inhibitor. The second container 144 and/or the sheets may further be hermetically sealed.

Referring again to FIG. 2, a second container 144 may also be provided but is not required in the present invention. The second container 144 illustrated in FIG. 2 has a cylindrical configuration, but as an alternative could have other shapes such as a square or octagonal configuration. The second container 144 has a container wall 150 and a bottom 152. An opening 154 in a top end of the second container 144 is closable. For example, a cap (or a top) 156 can be positioned in/or over the opening 154. Or as an alternative the second container 144 could be a box having an attachable top 156. The second container also 144 defines a container cavity 158 which is of a sufficient size to allow insertion of the prepackaged configuration 12 of the piston assembly 18 or a plurality thereof. The second container 144 is adapted to hold the components firmly therein. A container seal 160 may be provided on the top 156 of the second container 144 to engage the container wall 150 when the top 156 is positioned over the opening 154. Additionally, alternate containers could be manufactured from foam, plastic or fiber materials.

While the invention is susceptible to various modifications and alternative forms, a specific embodiment thereof has been shown by way of example in the drawings and is herein described in detail. It should be understood, however, that there is no intent to limit the invention to the particular form disclosed, but on the contrary, the intention is to cover all modifications, equivalents, and alternatives falling within the spirit and scope of the invention as defined by the appended claims.

INDUSTRIAL APPLICABILITY

The prepackaged piston assembly 10 of the present invention is prepared in the following manner. Components including the piston member 36 the plurality of rings 46 and the sleeve 30 are gathered and inspected for conformity to manufacturer's specifications. The plurality of rings 46 are installed into the ring grooves 42 in the appropriate positions. The plurality of rings 46 are compressed using a conventional ring compressor. Referring to the sleeve 30 of FIGS. 5 and 6, the sleeve 30 is positioned around the piston member until the sleeve 30 contacts the ring compressor. The sleeve 30 is pushed or pulled against the ring compressor sliding the sleeve 30 over the plurality of rings 46. As the sleeve 30 slides over the plurality of rings 46 the ring compressor slides off of the plurality of rings 46. When the plurality of rings are confined completely within the sleeve bore 54 the ring compressor is removed from the piston member 68.

If the sleeve 30 of the embodiment of FIG. 6 is to be used, the step of compressing the plurality of rings 46 would not require a conventional ring compressor. After the plurality of rings 46 are properly positioned on lower portion of the piston member 36 the sleeve 30 is positioned over the piston member 36 with the tapered portion 82 toward the plurality of rings 46. The sleeve 30 is them moved toward the plurality of rings 46 wherein the tapered portion 82 compresses the plurality of rings 46 as it moves. Movement of the sleeve 30 is ceased when the plurality of rings 46 are confined within the straight portion 80 of the sleeve 30.

Referring to the alternate sleeve 30' of FIGS. 7–10 the standard ring compressor is not require and the following procedure is used. After the components have been inspected, the plurality of rings 46 are installed into the ring grooves 42. The strap 86 is wrapped around the plurality of rings 46 that were previously installed in the ring grooves 42. The second end 96 of the strap 86 is mated with the latching member 100 and pulled until the plurality of rings 46 are in the compressed position. Once the plurality of rings 46 are in the compressed position, the latching member 100 is used to fix the variable inside diameter 90 of the sleeve 30' and maintain the plurality of rings 46.

A connecting rod 60 can be included with the piston assembly 10 or attached by the mechanic, since the sleeve 30 does not interfere with access to the wrist pin bore 54. The piston assembly 10 is next inserted into the a container 32 impregnated with a rust inhibitor and/or lubricant. Alternately, piston assembly may be coated with lubricant and/or rust inhibitor and vacuum sealed. The container 32 and rust inhibitor/lubricant protects the piston assembly 10 from environmental contaminants such as dirt and moisture during storage and transportation of the prepackaged piston assembly 18. The pre-packaged piston assembly 12 can be positioned in a second container 144 to protect the piston assembly 10 from physical damage such as breaking or scratching. The second container 144 may be adapted to hold a plurality of piston assemblies 10 in a pre-packaged configuration 12. However it is possible to have a single container which is capable of protecting the all piston assemblies 10 from all of the previously mentioned concerns. The container(s) 32,144 can additionally be sealed in a manner which requires breaking of the seal 140 when the prepackaged piston assembly 18 is removed by the mechanic. Usage of the seal 140 verifies to the mechanic that the piston assembly 10 has not been tampered with and conforms to the manufacturers' specifications.

After the engine block 16 has been prepared for assembly, installation of the pre-packaged piston assemblies 18 is accomplished by breaking the seal 140 and opening the container 32. The pre-packaged piston assembly 18 is then removed from the container 32. Although not required for the proper use of this invention, but desirable of a diligent mechanic, the position of the plurality of rings 36 may be verified through the transparent sleeve 30 or window 74. In this example a connecting rod 60 is attached to the piston assembly 10. The pre-packaged piston assembly 18 is now positioned above the respective cylinder bore 26 waiting installation. The piston assembly 10 is next lowered toward the cylinder bore 26 with the connecting rod 60 inserted first. The piston assembly 10 is further lowered toward and into the cylinder bore 26 until the bottom surface 66 of the sleeve 30 contacts the top surface 20 of the engine block 16. When the sleeve 30 contacts the block 16 the piston assembly 10 can be further inserted into the cylinder bore 26 by pushing on the top portion 38 of the piston member 36 or by pulling on the connecting rod 60. After the plurality of rings 46 have entered the cylinder bore 26 the sleeve 30 can be discarded. When all piston assemblies 10 have been installed into the engine 14 the remainder of the engine 14 components are assembled in a typical fashion.

The sleeve 30 of the present invention can be manufactured in a number of ways. Metal sleeves 30 can be machined from a removable cylinder liner by cutting the sleeves 30 to length and deburing the cut edges. Additionally sleeves 30 could be cut from a piece of tube or pipe with the proper inside diameter. A third method of manufacturing sleeves 30 could include injection molding from a plastic or alternate material.

Primary considerations of manufacturing sleeves 30 is to select a material which is sufficiently rigid to resist distortion and thermal expansion. Since there is typically only .002" difference between the inside diameter of the cylinder bore 26 and the outside diameter 78 of the piston member 36 the material characteristics must allow manufacturing to close tolerances. The cost of the selected material for the sleeve 30 should also be inexpensive, thus allowing the sleeve 30 to be discarded after a single use. Recycling sleeves 30 at this time does not appear to be a cost effective option since it would require the added expense of transportation.

Thus is can be seen that using a piston assembly 10 in the prepackaged configuration 12 during the assembly of an engine 6 increases quality of the rebuilt engine 14 by insuring that the piston assembly meets or exceeds manufacturers' specifications. Quality of the engine 14 is also enhanced when because the piston assembly 10 is less likely to be contaminated by dirt or moisture. The cost of rebuilding an engine 14 using the prepackaged piston assembly 18 is reduced because the time required to assembly large quantities of piston assemblies 10 in a factory setting is typically less than assembling small quantities in the field.

What is claimed is:

1. A piston assembly having a pre-established configuration, said piston assembly comprising:

a piston member having a plurality of ring grooves therein;

a plurality of rings being positioned within said plurality of ring grooves, said plurality of rings having an expanded position and a compressed position, said piston member and said plurality of rings being coated by one of a lubricant and a rust inhibitor;

a sleeve being positioned about said piston member and said plurality of rings, said sleeve maintaining said plurality of rings in said compressed position; and a container being positioned about said piston member.

2. The piston assembly of claim 1, wherein the container is a bag.

3. The piston assembly of claim 2, wherein said container is sealed.

4. The piston assembly of claim 1, wherein a second container is adapted to hold a plurality of piston assemblies in a pre-packaged configuration.

5. The piston assembly of claim 1 wherein said sleeve has a variable inside diameter.

6. A piston assembly having a pre-established configuration, said piston assembly comprising:

a piston member having a plurality of ring grooves therein;

a plurality of rings being positioned within said plurality of ring grooves, said piston member and said plurality of rings being coated by one of a lubricant and a rust inhibitor;

a sleeve being positioned about said piston member and said plurality of rings; and a container being positioned about said piston member.

7. The piston assembly of claim 6, wherein the container is a bag.

8. The piston assembly of claim 7, wherein said container is sealed.

9. The piston assembly of claim 6, wherein a second container is adapted to hold a plurality of piston assemblies in a pre-packaged configuration.

10. The piston assembly of claim 6 wherein said sleeve has a variable inside diameter.

* * * * *

UNITED STATES PATENT AND TRADEMARK OFFICE
CERTIFICATE OF CORRECTION

PATENT NO. : 6,779,660 B1
APPLICATION NO. : 09/960216
DATED : August 24, 2004
INVENTOR(S) : Kenneth D. Calvert et al.

It is certified that error appears in the above-identified patent and that said Letters Patent is hereby corrected as shown below:

IN THE CLAIMS
Col. 8, Line 47, Claim 22 is now Claim 11
Please insert Claim 11, as follows:

--11. The piston assembly of Claim 6 wherein said plurality of rings have an expanded position and a compressed position, and further wherein said sleeve being positioned about said piston member and said plurality of rings, said sleeve maintaining said plurality of rings in said compressed position.--

Signed and Sealed this

Nineteenth Day of February, 2008

JON W. DUDAS
*Director of the United States Patent and Trademark Office*